Sept. 12, 1967 G. KLEIMAN 3,340,918

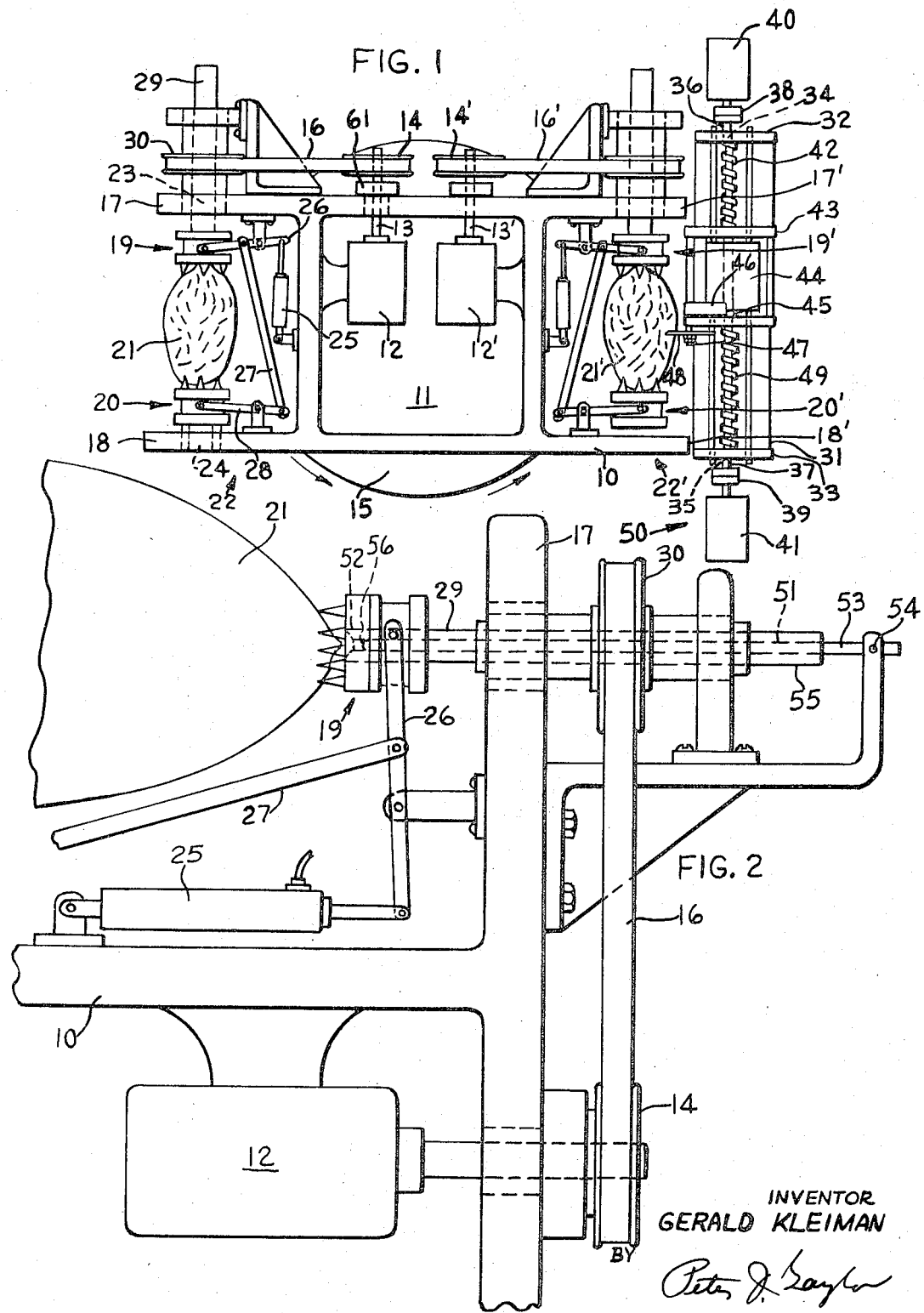

COCONUT SHELLING METHOD

Filed Sept. 22, 1965 2 Sheets-Sheet 2

INVENTOR
GERALD KLEIMAN
BY
*Peter J. Taylor*
ATTORNEY

United States Patent Office 3,340,918
Patented Sept. 12, 1967

3,340,918
COCONUT SHELLING METHOD
Gerald Kleiman, 62 Barchester Way,
Westfield, N.J. 07090
Filed Sept. 22, 1965, Ser. No. 489,209
4 Claims. (Cl. 146—242)

This invention deals with the shelling of coconuts. More specifically, it relates to a machine for removing the shells from coconuts and a process therefor. In particular, it relates to a novel gripping and ejecting mechanism, a cutting means, and a method for cutting the shell to obtain a maximum yield of shelled meat.

There have been numerous machines and methods proposed for shelling coconuts, and, in spite of the many attempts made to automate this operation, it is still a fact that all coconuts today are being shelled by a laborious and dangerous manual method. The problems involved with the proposed machines have been caused, to a great extent, by the nature of the coconut itself, a large ovate nut having a tough shell or pericarp, which encloses a layer of meat. The latter is difficult to remove cleanly and with minimum loss due to the aforesaid toughness, and irregular curvature.

Of the methods and machines proposed in the art, most of them have involved the use of clamps, employing pressure exerted against a surface, to hold the nut. Whether these clamps were smooth or pronged, they were ineffective in holding the nut adequately for effective shelling. Furthermore, many of the proposed shelling methods involved complex and expensive equipment requiring constant maintenance. The manner of shelling also included parallel cuts as well as helical cuts of the hard pericarp layer, but the manner of cutting resulted in inefficient separation of meat, and consequent high losses occurred.

In the present invention, at least one specially-designed penetrating gripper is employed at an end of the nut, and these grippers are designed to penetrate into the hard pericarp layer, whereby an excellent rigid (i.e., not flexible) anchorage is obtained therein to securely hold the nut while the hard shell layer is cut by a specially designed saw. Thereafter, the grip on the nut is locked, so that further pressure is not exerted. Also, the cut nut is ejected by novel means within a short time, so that a high efficiency is maintained. Furthermore, the novel shell cutting pattern of the present invention provides a rapid separation of shell and meat, with minimal loss of the latter.

Figure 4:
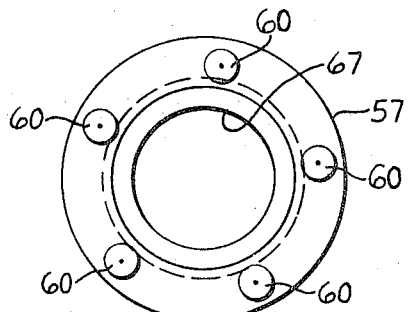
Figure 3:
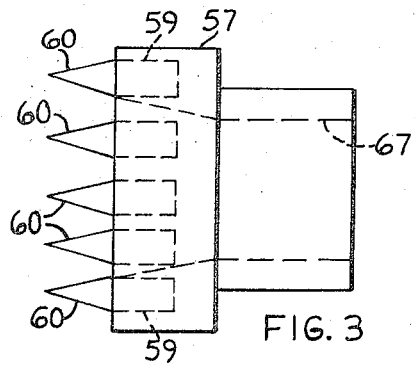
Figure 5:
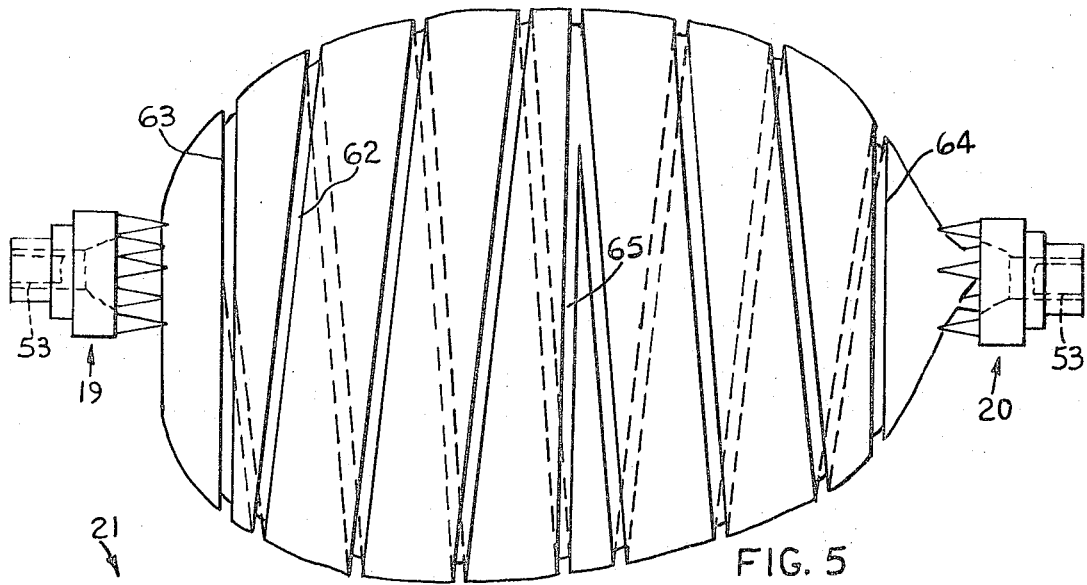
Figure 6:
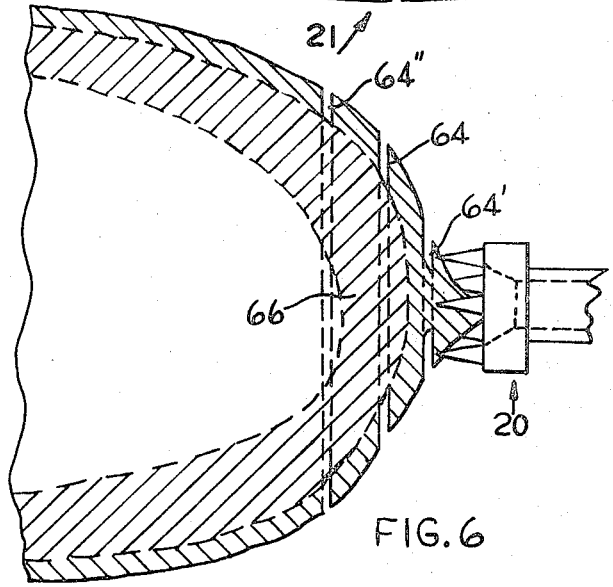

This invention will be more readily understood by reference to the accompanying drawings in which a preferred embodiment is described, and in which FIGURE 1 presents a schematic top or plan view of the machine employed for cutting the shell layer preparatory to deshelling. FIGURE 2 illustrates a schematic side view of a gripping portion of the machine, illustrating use of one type of ejector. FIGURES 3 and 4 show an elevational side view and front view, respectively, of a penetrating gripper of the present invention. FIGURE 5 depicts a top view of a coconut as gripped in the machine, and as cut with the cutting pattern of the present invention, while FIGURE 6 shows a cross-sectional side view of half of a gripped coconut, and illustrating the desired manner of effecting the end cuts on the shell. The same numerals refer to similar parts in the various figures.

Referring again to the drawings, numeral 10 refers to a horizontal base mounted on turntable 15, and having a central open area 11 wherein are mounted motors 12 and 12' used for rotating the nuts. Shafts 13 and 13', respectively, of these motors have attached thereto pulleys 14 and 14' for driving belts 16 and 16'. Laterally-directed arms 17 and 18 and 17' and 18' project from base 10 and serve as mountings for the rotating penetrating grippers 19 and 20 and 19' and 20', respectively. Between these grippers, coconuts 21 and 21' are tightly and rigidly held.

It is apparent that both sides of the base 10 hold nut mounting and rotating units (indicated generally as 22 and 22', respectively), which are similar to each other, and which are mounted on the base in optical image relation to each other. Description of any portion of one unit would be equally applicable to the other. Grippers 19 and 20 are mounted in bearings 23 and 24 in a manner such that they may be moved, while rotating on their bearings, to and from nut 21. This movement is effected by a pneumatic or hydraulic piston-cylinder motor unit 25, which actuates lever arm 26 to move gripper 19, and through arm 27 and lever 28 to move gripper 20. Although the movement of both grippers 19 and 20 is preferred, it is to be understood that one gripper, e.g., gripper 20 may be stationary, while gripper 19 is laterally movable. Shaft 29, attached to gripper 19 at threaded opening 67 (FIGURE 3), is also attached to pulley 30, which is driven by belt 16 to rotate nut 21.

Adjacent to rotating unit 22', there is disposed base 31 having uprights 32 and 33, which serve as bearings at 34 and 35 for interconnected shafts 36 and 37, which shafts are driven (through clutches 38 and 39) by motors 40 and 41, respectively. A worm screw 42 attached to clutch 38 serves to move laterally the bed 43 carrying cutter motor 44. Shaft 45 of motor 44 is connected by a gear train 46 to rotatable cutter shaft 47 to which cutter blade 48 is attached. Motor 41 is connected to worm 49 which may be used to similarly move another cutter (not shown) disposable opposite cutter 47. The cutter unit, indicated generally by numeral 50, may be designed to be raised and lowered, to allow clearance thereunder of base 10, as it is rotated on turntable 15.

In the arrangement shown in FIGURE 1, one motor is designed to drive the cutter from the center of the nut to one end thereof. The other motor reverses the rotation of the lead screw and returns the cutter to center position for the next cut.

When in operation, an operator located at unit 22 would actuate a switch causing hydraulic motor 25 to separate grippers 19 and 20, after which he inserts coconut 21 axially into the space therebetween and actuates motor 25 to cause grippers 19 and 20 to penetrate into the ends of the coconut shell. Thereafter, the hydraulic pressure is shut off, so that the grippers are locked in place. In the event the nut is weakened by the cutting operation, no further pressure is being exerted on the nut, thereby avoiding its collapse. Motor 12 then is started, and turntable 15 is turned until unit 22 is adjacent cutter unit 50, whereupon cutter 48 is lowered (or raised, or both cutters are moved) to the coconut and the cutting of the hard shell is effected. Thereafter, the cut nut is ejected. Meanwhile, the operator places the next coconut 21' in unit 22' to be gripped by grippers 19' and 20', for return movement of turntable 15 and the cutting of the shell of coconut 21'.

One type of ejector, useful for the present invention, is shown in FIGURE 2. Shaft 29 has a cylindrical bore 51 which extends through the shaft and connects with internal opening 52 in gripper 19. Ejector rod 53 is mounted within opening 52, in stationary position, with one end attached at 54 to support bracket 55. The other end of rod 53 is disposed within gripper 19 far enough to not interfere with the end of nut 21. When lever arm 26 is moved away from nut 21 by motor 25, rod end 52 remains in position and it forces nut 21 from gripper 19 as the latter moves away from nut 21.

As is apparent from FIGURES 3 and 4, the grippers comprise a hollow end body 57 which is preferably circular. In the forward face 58 of the body are mounted, in holes 59, the pointed gripping prongs 60, which are imbedded in the shell of the coconut. These prongs may be screwed or pressed into threaded or plain holes 59. Although a minimum of at least two prongs are required in one gripper and at least one holding means in the other oppositely-disposed gripper, it is most desirable to have at least 3, and preferably four or five prongs on each gripper. They are clustered, preferably in a circle of approximately 3/4" to 1" diameter. It has been found that a smaller circle diameter requires an unnecessarily high torque to rotate the nut against the cutter blade, resulting in possible breakage of the tips of the prongs. A larger circle diameter was found to cause the outer prongs to interfere with the cutting blades as they reach the end of the cut. Since it is essential that the grippers penetrate into the tough shell, it has been found that the taper portions of the prongs 60 must have a diameter-to-length ratio in the range of about 4:1 to about 1:5, with the ratio about 1:3 being most desirable. With a reasonable non-crushing pressure of the grippers, this enables the prongs to penetrate into the nut for a distance of about 0.005" to about 0.20", the average penetration being about 0.02", with which it is safely possible to cut the grooves in the shell while it is rotating at a reasonable speed. The actuation of the grippers is accomplished by conventional hydraulic, pneumatic or mechanical means, it being understood that the gripping operation be rigid, rather than flexible. In the prior art, spring-loaded clamps have been used, and these have proved to be not only dangerous, but also mostly ineffective. The gripper drive is desirably transferred through a clutch 61, of conventional construction.

The cutters 48 are essentially circular saw blades with hard carbide cutting edges, and the cutter tips are as thin as mechanically possible in order to minimize product loss in the event meat is penetrated. This thickness of the blade is desirably not over 0.05", and is preferably 0.03". A conventional depth of cut guide (not shown) is disposed at the blade and is adjusted for the maximum shell thickness of the coconuts grown in a specified area. In the event some portions of the cut are not severed completely through the shell, the remaining thickness will not be enough to prevent an operator to break through during the shelling operation.

As shown in FIGURE 5, the cutting pattern is an important feature of the present invention. Although a spiral cut 62 along the body is desired, it is highly important that a continuous circular cut be made at near each end of the nut 21, as at 63 and 64. These are made about 3/8" to about 3/4" from the grippers at each end, preferably 1/2". This greatly facilitates the shelling operation, since the operator merely inserts his prying tool or knife in each of the circular cuts and quickly peels off each shell cap at the nut end. Thereafter, the peeling of the remaining shell strips is relatively easy. As is seen from FIGURE 6, it has been found that if the circular cut is made too near the end, as cut 64', there is too thick a layer of shell remaining, making the cut ineffective. If the cut is made too far away from the end, such as cut 64", then an excessive amount of meat 66 breaks out with the removal of the end cap. The desired cut 64 merely penetrates only a small portion of the meat.

It is also desirable to make a continuous circular cut near the middle of the nut, as at 65. The pitch of spiral cuts 62 should be about 3/8" to about 1", and preferably about 3/4", as a smaller pitch not only requires greater time for removal, but it also gives too narrow a shell cross-section, causing shell breakage during the peeling step. A larger pitch results in a highly-curved width section, making the shell too difficult to peel from the meat.

Although the cutter will cut satisfactorily regardless of the direction of nut rotation, it is preferable to rotate the nut in a direction opposite to that of the cutter blade. In such case, shell particles removed by the cutter are not impacted against freshly cut meat and caused to penetrate into the meat. Coconut product dirtied with shell fragments or skin particles is undesirable from the sales viewpoint. The cutter blade is run at a speed of about 4000 to about 10,000 r.p.m., preferably at about 8000, whereas the nut is rotated at up to 120 r.p.m., preferably at 60–90. Beyond this maximum, the blade of the cutter has difficulty in following the periphery of the nut, particularly if it is not round.

Nut rotation is begun prior to arrival to the cutting position. Desirably, two circular cutter blades, first disposed substantially midway between the grippers, and approximately on opposite sides of the nut, begin to cut the shell in a circular groove 65 for the depth of the shell around the center of the nut as the latter rotates. When this complete circular groove has been cut, each blade begins advancing toward its opposite end, while cutting a spiral groove in the shell as it advances. As the cutters reach a point approximately 1/2" from the pin gripping area at each end, the advance is stopped, and the blades 48 are allowed to cut a circular groove 63, 64. This cutting program may be similarly performed by a single cutter properly programmed by conventional means for cutting from one end of the nut to the other.

When the continuous circular grooves at the ends are completed, the cutters are retracted and the grippers are pulled away from the nut, whereby the ejectors 53 automatically eject the nut from the machine.

The main shell is removed by an operator by simply peeling off the spirally cut shell. This is done by grasping the shell portion at the small end of the nut and lifting the edge of the shell sufficiently to break the bond between the shell and the dark skin covering the meat, and continuing the unwinding toward the center of the nut. When the unraveling reaches the center of the nut, the shell coil will fall off in one piece, so that essentially no shell fragments will be left adhering to the coconut meat. By grasping the spirally-cut shell at the other end, and repeating the procedure, the other half of the spirally-cut shell may be removed. Occasionally, it may be necessary to slip a sharp-edged tool under the edge of the shell spiral to start the unpeeling procedure.

I claim:
1. A method for shelling a coconut, comprising,
   gripping said nut rigidly at its ends with grippers and penetrating into the shell coating during the gripping operation,
   locking said grippers into an axially fixed position,
   rotating said shell by rotation of said grippers,
   cutting into and through said shell layer by a rotatable cutter while said nut is rotating,
   making a spiral cut around the central portion of said nut,
   making a continuous circular cut at each end of said nut near each gripped portion, and
   removing said nut from said grippers.
2. A method according to claim 1 in which a continuous circular cut is made into and through said shell layer about midway between the ends of said nut, and a spiral cut is made from said latter cut to each of said circular end cuts.
3. A method according to claim 1 in which the circular end cuts are made about 3/8" to about 3/4" from the gripped portion.
4. A method according to claim 1 in which the pitch of the spiral cuts is about 3/8" to about 1".

References Cited

UNITED STATES PATENTS 1,374,899   4/1921   Baker _____ 146—242
1,860,746   5/1932   MacDougall _____ 146—7

WILLIAM W. DYER, JR., *Primary Examiner.*

W. GRAYDON ABERCROMBIE, *Examiner.*